Inventor:
Hubert T. Hovance,

United States Patent Office

3,532,951
Patented Oct. 6, 1970

3,532,951
MOTOR CONTROL SYSTEM
Hubert T. Hovance, Kent, Ohio, assignor, by mesne assignments, to National-Standard Company, Niles, Mich., a corporation of Delaware
Filed Mar. 14, 1968, Ser. No. 713,170
Int. Cl. H02p 5/06
U.S. Cl. 318—331                                    8 Claims

ABSTRACT OF THE DISCLOSURE

A system for controlling a shunt wound DC electric motor having field and armature windings. The system includes circuit means having rectifier bridge circuits to apply current pulses to the field and armature windings from an AC power source. Gate-controlled semiconductor switches are connected in the circuit to selectively control the current pulses to the windings. A phase control circuit is connected across the armature to control the motor speed. A shorting circuit is connected across the armature winding and includes semiconductor means adapted to short dynamic braking currents through the armature winding while preventing the shorting of applied armature pulses.

BACKGROUND OF THE INVENTION

The present invention relates to motor control systems, and more particularly to a system for effecting starting and braking of a shunt wound DC electric motor without creating damaging arcing.

Shunt wound DC electric motors find wide application in both industrial and commercial operations. Such electric motors are generally selected for their ability to provide fairly constant speed. Many applications of shunt wound motors, such as in weld wire feeding devices, require frequent starting and stopping of the motors.

An accepted method of braking shunt wound DC motors is to remove the exciting current pulses from the armature circuit, while leaving the field coil excited. The armature thereafter continues to rotate freely due to its own inertia and the inertia of its connected load. To bring the armature to a rapid stop, or to a stop during a controlled period, the rotor or armature energy must be dissipated in another manner.

The armature, while freely rotating within the excited field winding, generates a voltage of the same polarity as the original exciting voltage. If the armature is connected in an external circuit, a current will flow through the armature winding creating a magnetic flux opposing the field winding flux. The magnetic opposition of the field and armature fluxes, plus the normal frictional losses, causes the armature to come to rest quickly, generally termed dynamic braking. The greater the current which can be made to flow within the armature winding, the more rapidly the armature will be brought to rest.

If the impedance of the armature winding and external short circuit are relatively low, the current induced in the armature circuit will be very high. To interrupt the induced armature current during its period of flow by means of a relay contact or switch contact generally produces a damaging arc caused by collapse of the magnetic flux about the armature. Repeated opening and closing of the switch contacts during the period of dynamic braking can produce degradation of the contact materials and eventual failure of the device. There thus exists a need for a motor control system which allows the switch contacts to be repeatedly opened and closed during operation without danger of destructive arcing.

SUMMARY OF THE INVENTION

Accordingly, one of the primary objects of the present invention is to provide a system for controlling shunt wound DC electric motors which allows repeated dynamic braking and restarting without producing damaging arcing.

Another object of the present invention is to provide a shunt wound motor control system which employs semiconductor switch means to selectively control the application of current pulses to the field and armature windings.

Another object of the present invention is to provide a system for controlling a shunt wound DC electric motor having first and second field windings connected to establish opposite magnetic fluxes, which system includes circuit means having gate-controlled semiconductor switch means for controlling the application of current pulses to either of the field windings and the armature winding.

A further object of the present invention is to provide a motor control system as described including an external shorting circuit connected across the armature winding, which external circuit includes semiconductor means adapted to allow current flow through the external circuit during dynamic braking while preventing flow therethrough of the amplified armature pulses.

Another object of the present invention is to provide a motor control system as above described wherein the semiconductor means comprises a silicon controlled rectifier having its gate controlled by a pulse generating circuit operable to bias the gate on during dynamic braking.

Further objects and advantages of my invention together with the organization and manner of operation thereof, may best be understood by reference to the following description of preferred embodiments of the invention when taken in conjunction with the accompanying drawings, in which like reference numerals designate like parts.

DESCRIPTION OF PREFERRED EMBODIMENTS

Figure 1:
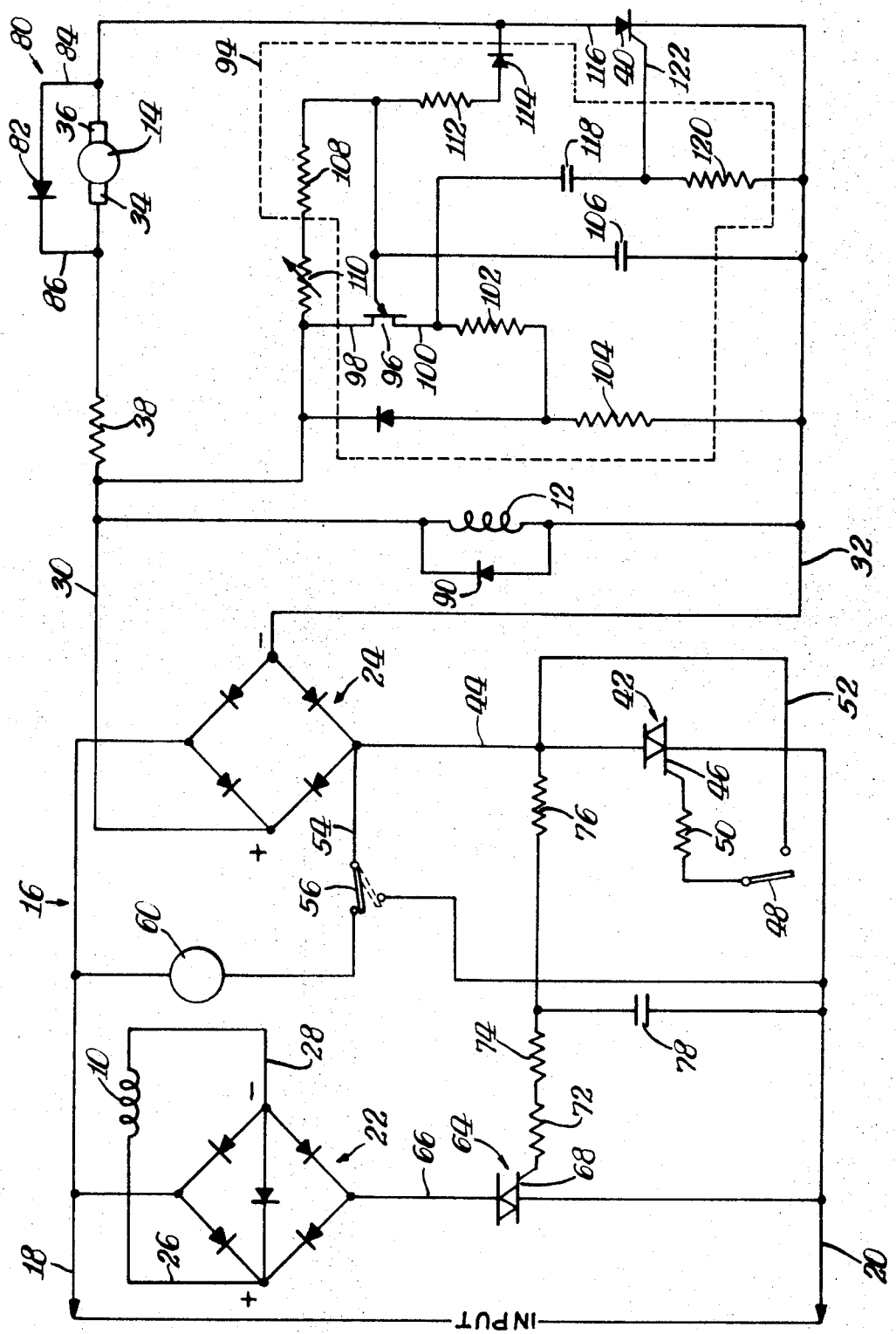
FIG. 1 is a circuit diagram schematically illustrating one embodiment of a motor control system in accordance with the present invention.

Referring now to FIG. 1, one embodiment of a system for controlling a shunt wound DC electric motor in accordance with the present invention is illustrated schematically. The control system of FIG. 1 is illustrated in conjunction with a shunt wound DC electric motor having field winding means including a first field winding 10 and a second field winding 12. The shunt wound motor includes armature winding means 14 associated with the first and second field windings 10 and 12 in a conventional known manner. For example, it is known to support an armature for movement relative to the stationary field windings, or conversely, to support the field windings for movement relative to a fixed armature winding. Such constructions find application in both rotary and linear shunt wound DC electric motors. The field windings 10 and 12 are connected such that their respective magnetic fluxes are established in opposite directions.

The control system of FIG. 1 includes circuit means, indicated generally at 16, adapted to connect the field winding means including field windings 10 and 12 and the armature winding means 14 to an alternating current supply (not shown) for applying current pulses to the field and armature winding means. The alternating current supply is connected to the circuit means 16 through conductors 18 and 20.

The circuit means 16 includes rectifier means comprising first and second conventional full wave rectifier bridge circuits 22 and 24, respectively. The first conventional full wave rectifier bridge circuit 22 is connected to the first field winding 10 of the field winding means. The first field winding 10 may be termed the "braking" winding of the field winding means.

The second full wave rectifier bridge circuit 24 is connected to the second field winding 12 of the field winding means through conductors 30 and 32. The second field winding 12 may be termed the "run" winding. The rectifier bridge circuit 24 is also connected to the armature winding 14 through conventional brush contacts indicated at 34 and 36. The brush contact 34 normally provides the positive polarity contact to the armature winding 14 and is connected to the conductor 30 through a resistor 38 which serves to limit the current pulses applied to the armature winding through the rectifier bridge circuit 24. The brush contact 36 normally serves as the negative pole contact to the armature winding 14 and is selectively connected to the conductor 32 through a silicon-controlled rectifier 40, the operation of which will be more fully described hereinbelow.

The circuit means 16 includes a first semiconductor switch means, indicated generally at 42, for selectively controlling the application of current pulses to the armature winding means 14. The semiconductor switch means 42 also selectively controls the application of current pulses to the second or "run" field winding 12. Control of the current pulses to the armature winding 14 and second field winding 12 is effected by the semiconductor switch means 42 through opening and closing the power supply circuit to the second rectifier bridge circuit 24. The semiconductor switch means 42 preferably comprises a gate-controlled semiconductor switch such as a triac, having its anode connected to the rectifier bridge circuit 24 through a conductor 44. The gate 46 of the gate-controlled semiconductor switch 42 is connected to a normally open manually operable switch means 48 through a suitable resistor 50. The switch means 48 may be actuated by a trigger as when the shunt wound DC electric motor is used in conjunction with a weld wire feeding device and the like.

The switch means 48 is operable to selectively connect the gate 46 of the gate-controlled semiconductor switch 42 to the alternating current supply through a conductor 52 which is connected to the conductor 44. The conductor 44 is connected to the input conductor 18 through a circuit including a conductor 54 connected to the conductor 44, a normally closed advance switch 56, and a relay coil 60 connected between the advance switch and the input conductor 18. It can be seen that with the advance switch 56 in its normally closed position, closing of the trigger switch means 48 will apply an alternating current signal to the gate 46 of the gate-controlled semiconductor switch 42 thereby serving to turn the gate-controlled switch on in a known manner.

The circuit means 16 includes a second semiconductor switch means, indicated generally at 64, having its anode connected to the first rectifier bridge circuit 22 through a conductor 66, and having its cathode connected to conductor 20. A gate element 68 of switch means 64 is connected through resistors 72, 74 and 76 to the conductor 44. The switch means 64 preferably comprises a triac similar to the switch means 42. A capacitor 78 is connected in series with the resistor 76 to establish an R-C control for the firing of the gate 68 of switch means 64.

The first and second semiconductor switch means 42 and 46, respectively, are connected in the circuit means 16 such that when the trigger switch 48 is open, the full supply line voltage appears across the switch means 42 and serves to apply an apppropriate bias signal to the gate 68 of the second switch means 64. Biasing the gate 68 turns the second switch means 64 on and completes the circuit through the rectifier bridge circuit 22 so as to apply current pulses to the first field winding 10. When the trigger switch 48 is closed, an AC bias signal is applied to the gate 46 of the first semiconductor switch means 42 to turn the first switch means on. The resulting voltage drop across the switch means 42 as it conducts is sufficient to reduce the signal applied to the gate 68 of the second semiconductor switch means 64 to a value less than the minimum biasing signal required to turn the switch means on, thereby causing the second switch means to turn off when the current pulse through conductor 66 reaches a value less than the holding current for second semiconductor switch means. With the first and second semiconductor switches 42 and 64, respectively, connected in the circuit means 16 as described, it will be understood that simultaneous application of current pulses to the first and second field windings 10 and 12, respectively, through their associated rectifier circuits is prevented.

The control system of FIG. 1 further includes additional circuit means, indicated generally at 80, associated with the armature winding means 14. The circuit means 80 provides a first directional closed or shorting current path through the armature winding means for induced current pulses in the armature winding created by the counter electromotive force established in the armature winding when the first semiconductor switch means 42 is turned off, and the second semiconductor switch means 64 is turned on. The induced current creates a magnetic flux about the armature winding which opposes the magnetic flux of the field winding 10 to effect dynamic braking of the armature. The additional circuit means 80 includes a semiconductor 82, such as a diode, having its anode connected to the brush contact 36 through a conductor 84, and having its cathode connected to the brush contact 34 through a conductor 86. The semiconductor diode 82 is connected to allow flow of the dynamic braking current through the armature winding, while preventing flow through the circuit means 80 in a direction opposite to the first direction. More specifically, the diode 82 is connected in the circuit means 80 to allow flow of the dynamic braking current, and prevent flow of the applied armature current pulses.

A semiconductor, such as a diode 90, is connected across the second field winding 12 in a manner to dissipate currents induced in the second field winding when switch means 64 is conducting and switch means 42 is off, as when trigger switch 48 is initially opened.

The control circuit means 16 includes a conventionally known phase control circuit, indicated generally at 94, which is utilized to effect control of the above-described silicon controller rectifier 40, and thereby the normal forward driving current pulses through the armature winding 14. The phase control circuit 94 is connected across the conductors 30 and 32 in parallel with the armature winding means 14. As noted, the phase control circuit 94 is of conventional known design and is not felt to require detailed description. Briefly, the phase control circuit 94 includes a unijunction 96 having a first base element 98 connected to the conductor 30, and a second base element 100 connected through resistors 102 and 104 to the conductor 32. The emitter element of the unijunction 96 is connected to an R-C timer including a capacitor 106, a fixed resistor 108 and a potentiometer 110. The potentiometer provides for variable phase firing of the unijunction 96. A high ohmic resistor 112 and a semiconductor means, such as a diode 114, are connected in series with the fixed resistor 108 between the conductor 30 and a conductor 116 which connects the brush contact 36 to the anode of SCR 40. A capacitor 118 and a resistor 120 are connected in series between the second base element 100 of unijunction 96 and the conductor 32. A conductor 122 connects the gate of the SCR 40 to the junction of capacitor 118 and resistor 120 for firing the gate and turning on the SCR as determined by the setting of the potentiometer 110 in a conventional manner.

The operation of the shunt wound DC electric motor control system illustrated in FIG. 1 is briefly as follows. The conductors 18 and 20 are connected to an appropriate alternating current supply, such as a 115-volt AC source. With the trigger switch 48 in its normally opened position, the first gate-controlled semiconductor switch 42 will be in an off state, thereby preventing the application of current pulses to the field winding 12 and armature winding 14 of the shunt wound motor. With trigger switch means 48 in its open position, the gate 68 of the second gate-controlled semiconductor switch means 64 will be biased to turn on the second switch means 64, thereby applying current pulses to the first field winding 10. With no current pulses being applied to the armature 14, the shunt wound motor will not be actuated.

Closing the trigger switch 48 serves to apply an AC signal to the gate 46 of the first gate-controlled semiconductor switch means 42 to turn it on. Simultaneously, the voltage signal to the gate 68 of second switch means 64 is reduced to a value insufficient to maintain the switch means 64 turned on. Second switch means 64 will therefore return to its blocking state at the end of the next AC cycle applied to its anode as the voltage signal goes to zero. With trigger switch 48 so closed, current pulses will be applied to both the armature winding 14 and the second field winding 12, as well as to the phase control circuit 94. The DC shunt wound motor will thereby be caused to rotate in a forward direction, the speed of rotation being selectively varied through adjustment of the potentiometer 110 in the phase control circuit 94 in a conventional known manner.

Turning on the first gate-controlled semiconductor switch means 42 also serves to energize the relay coil 60 which may be employed to actuate an auxiliary device, or to turn on a power switch to supply electrical power to an associated device simultaneously with energizing the motor armature 14.

Releasing the trigger switch 48 to open it removes the bias signal from the gate 46 of the first switch means 42, causing the first switch means to revert to its blocking state as the signal applied to its anode goes to zero. Turning off the switch means 42 removes the signal pulses from the armature winding 14 and second field winding 12. At the next half-cycle of the supply voltage appears across the semiconductor switch means 42 after it has reverted to its blocking state, the gate-controlled switch means 64 will be biased to its conducting state. As noted above, the first and second field windings 10 and 12 are connected in the shunt wound motor such that they produce opposite magnetic fluxes upon being energized. Thus, the magnetic flux established by braking field winding 10 is opposite to that previously established by the field winding 12. With the armature 14 continuing to rotate due to its own inertia and the inertia of any connected load, a counter electromotive force is induced in the armature winding 14 and induces a current through the armature and shorting circuit 80 having a polarity reversed from the polarity established during normal forward running of the shunt-wound motor. With the polarity of the induced current in the armature winding 14 so reversed, the induced current will flow through the diode 82 in the circuit 80, which diode is forward biased in the direction of reversed armature polarity, and effect dynamic braking to bring the armature to rest quickly. Closing the trigger switch 48 at any time during the dynamic braking period, or thereafter, will restore the armature to its normal driving rotation. The use of semiconductors in the control system of FIG. 1 eliminates the problems of arcing existant in the prior art motor control systems.

When it is desired to controllably advance the armature of the shunt wound motor as, for example, through a small number of revolutions, the advance switch 56 connected to the conductor 54 may be moved to the position shown in dash lines wherein signal pulses will be applied through the rectifier bridge circuit 24 to the field winding 12 and armature winding 14 of the motor. The use of advance switch 56 serves to advance or actuate the armature 14 of the motor in a forward direction and is useful when the motor is not going to be utilized in rapid on-off fashion wherein the dynamic braking characteristics of the control system are desirable.

Figure 2:
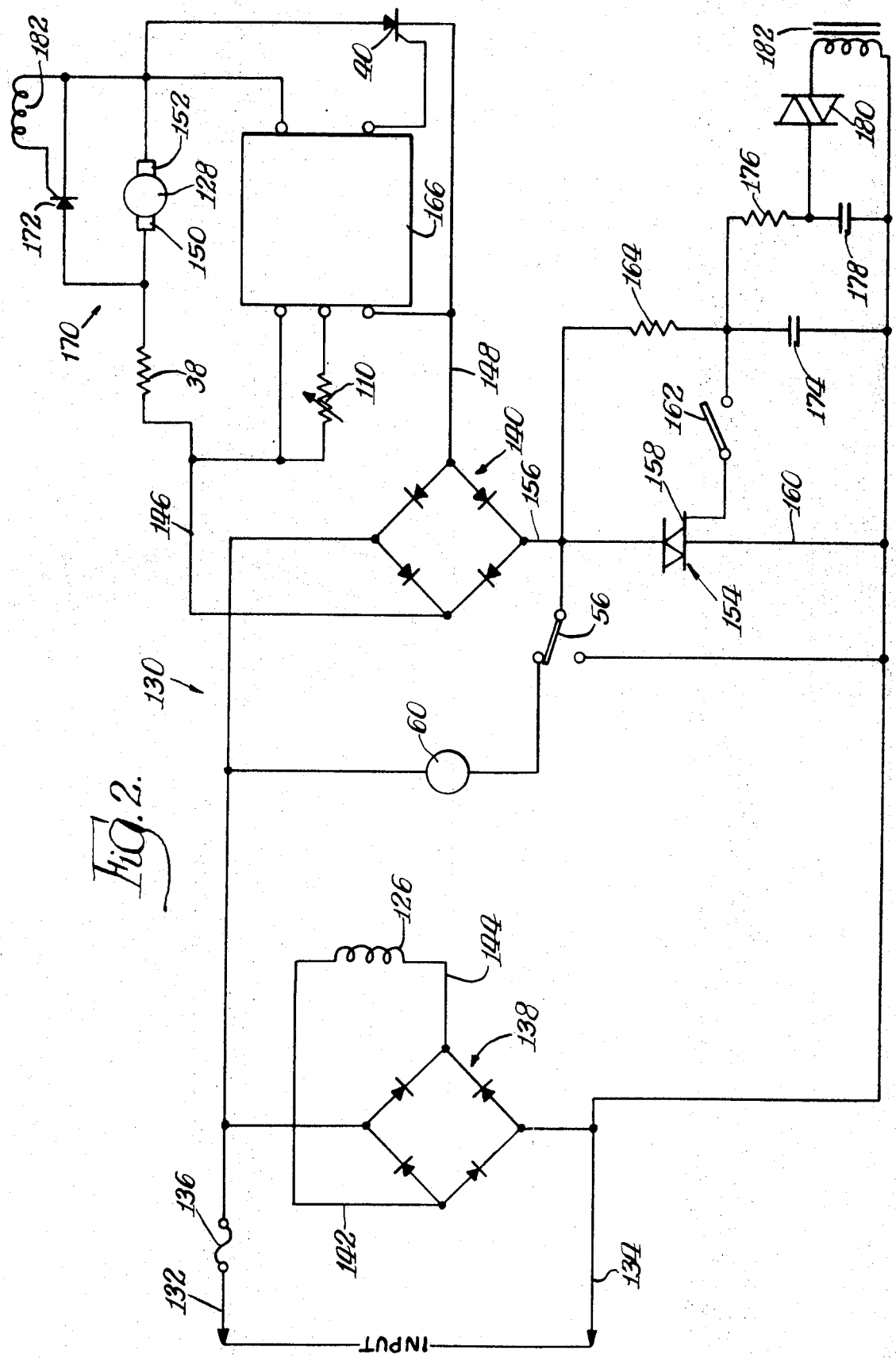
FIG. 2 is a circuit diagram schematically illustrating another embodiment of a motor control system in accordance with the present invention.

FIG. 2 illustrates another embodiment of a system for controlling a shunt wound DC electric motor according to the present invention. The control system of FIG. 2 finds application for use in controlling a shunt wound motor having field winding means comprising a single field coil 126 and an armature winding means 128. As will become more apparent hereinbelow, the single field winding shunt wound motor control circuit of FIG. 2 is desirable where instant restart is not required after deenergizing the armature winding. The control circuit of FIG. 2 effects a stop in the rotational movement of the armature 128 prior to its being restarted in rotational movement. The time delay between closing a trigger switch 162 and actual restarting of the motor has been found to be negligible, being in the order of less than one-half second.

The field winding 126 and armature winding 128 of the shunt wound motor utilized with the control circuit of FIG. 2 are structurally associated in a conventional manner, the structural components supporting the field and armature windings being such as to provide conventional relative movement between the field and armature windings. The control system includes circuit means, indicated generally at 130, adapted to connect the field winding means 126 and armature winding means 128 to an alternating current supply (not shown) through conductors 132 and 134 for applying current pulses to the field and armature winding means. A safety fuse 136 is preferably provided in the conductor 132.

The circuit means 130 includes rectifier means comprising a first conventional rectifier bridge circuit 138 and a second rectifier bridge circuit 140. The rectifier bridge circuit 138 is connected across the conductors 132 and 134 to the alternating current supply, and to the field winding 126 through conductors 142 and 144. The second rectifier bridge 140 is connected to the armature winding 128 through conductors 146 and 148 and conventional brush contracts 150 and 152 as found in rotary shunt wound electric motors.

The circuit means 130 includes a first semiconductor switch means, indicated generally at 154, which preferably comprises a gate-controlled semiconductor switch identical to the above-described gate-controlled semiconductor switch means or triac 42. The semiconductor switch means 154 is connected between the rectifier bridge circuit 140 and the conductor 134, the anode of the switch means 154 being connected to the rectifier bridge circuit 140 through a conductor 156 and the cathode being connected to conductor 134 through a conductor 160. The first semiconductor switch means 154 is adapted to selectively control the application of current pulses to the armature winding means 128. Control of the first switch means 154 is effected through controlling the application of biasing signals to a gate 158 of the first semiconductor switch means. Control of the bias signals to the gate 158 is effected through a normally open manually operable trigger switch 162 in similar fashion to the control of the above-described triac switch 42. Closing of the trigger switch 162 connects the gate 158 of the first semiconductor switch means 154 to the alternating current supply through a resistor 164, an advance switch 56, and a rely coil 60 so as to apply a bias voltage to the gate. Closing the trigger switch 162 biases the semiconductor switch means 154 to a conducting state to complete the circuit through the rectifier bridge circuit 140 and apply current pulses to the armature winding means 128 of the shunt wound motor.

The circuit means 130 includes a phase control circuit, indicated schematically at 166, associated with the armature means 128. The phase control circuit 166 is identical to the above-described phase control circuit 94 with the potentiometer 110 serving to provide a means for varying the firing of the SCR 40 to control the normal forward speed of the armature winding 128 in a known manner. The phase control 166, being identical to the above-described phase control circuit 94, includes semiconductor means such as a diode 114 for dissipating the current pulses created by the counter electromotive forces induced in the armature winding 128 upon collapse of the magnetic flux of the armature winding when the semiconductor switch means 154 is turned off.

As was noted above with respect to the shunt-wound DC electric motor control system of FIG. 1, when the current pulses normally applied to the armature winding means 128 to effect forward rotation thereof are removed, the inertia of the armature and any inertia of a connected load will cause the now deenergized armature to continue rotation. If the field wind 126 continues to receive current pulses therethrough, a counter electromotive force will be established in the rotating armature winding 128 which, if the armature winding is connected to an external closed circuit, will effect a relatively high induced current through the armature winding and its associated closed circuit. Appropriate resistance placed in the external circuit to the armature will serve to allow dynamic braking of the armature winding and bring it to a rapid stop. The counter electromotive force, or back electromotive force, establishes a voltage at the terminals of the armature winding of the same polarity as the applied voltage during normal forward rotation. If the armature terminals are short circuited, heavy induced currents will flow since the armature circuit is normally of very low impedence, the direction of the induced current being in a direction opposite to the originally applied current pulses.

The control system illustrated in FIG. 2 includes addition circuit means, indicated generally at 170, associated with the armature winding means 128 to provide a first directional closed current path through the armature winding for the current pulses resulting from the above-described counter electromotive force upon collapse of the magnetic flux of the armature winding upon removal of the signal pulses therefrom. The additional short circuit means 170 includes semiconductor means such as a silicon-controlled rectifier 172 having its anode connected to the armature winding 128 through the brush contact 150, and having its cathode connected to the armature winding through the brush contact 152.

The additional circuit means 170 includes a phase controlled pulse generating circuit portion including the resistor 164, a capacitor 174 connected in series with the resistor 164, a resistor 176 connected to the junction of the resistor 164 and the capacitor 174, a cappacitor 178 connected in series with the resistor 176, and a diac 180 connected to the juncture of resistor 176, and capacitor 178. The signal from the pulse generating circuit is transformer coupled through a transformer 182 to the SCR 172 connected across the armature winding 128. The components in the pulse generating circuit are selected such that a pulse signal is formed late in the cycle of each half-cycle of applied AC power to the pulse generating circuit when the trigger switch means 162 is opened. The resistor 164 is such that when the trigger switch means 162 is closed to turn on the semiconductor switch means 158, the pulse generator circuit is turned off.

The operation of the shunt wound DC electric motor control system illustrated in FIG. 2 is briefly as follows. With the conductors 132 and 134 connected to an appropriate alternating current source, current pulses will be continuously applied to the field winding 126. With the trigger switch means 162 in its normally opened position, no current pulses will be applied to the armature winding 128 and thus the armature of the shunt wound motor will not rotate.

Closing the trigger switch means 162 serves to turn on the gate-controlled semiconductor switch 154 and energize the armature winding 128 to effect forward rotation thereof. As was noted above with respect to the control circuit of FIG. 1, the phase control circuit 166 may be adjusted by means of potentiometer 110 to close the circuit through the armature winding 128 during a selected portion of each half-cycle of the full wave rectified current pulses from the rectifier bridge circuit 140.

When the gate circuit of the switch means 158 is opened by releasing the trigger switch 162, current pulses through the switch means and the associated rectifier bridge circuit 140 will continue until the end of the half-cycle of applied AC power whereupon the switch means 154 reverts to its blocking state. With no current pulses being thereafter applied to the armature winding 128, the armature magnetic flux collapses reversing the output polarity of the armature instantaneously. After the gate-controlled switch means 154 is turned off, the voltage across the switch means 154 rises to the full applied voltage, thereby energizing the pulse generating circuit. As above noted, the pulse generating circuit is adapted to trigger the SCR 172 into a conducting state near the end of the first cycle of the applied voltage signal.

With the SCR 172 in the additional circuit means 170 being turned on, the resultant high armature current created by the induced counter electromotive force upon collapse of the armature magnetic flux flows through the short circuit including the SCR 172 to effect dynamic braking and bring the armature to a rapid stop. The current resulting from the collapse of the armature magnetic flux is also dissipated by the diode 114 in the phase control circuit 166, which is identical to the phase control circuit 94 described above with respect to FIG. 1. The SCR 172 will continue to conduct the current resulting from the counter electromotive force in the armature winding irrespective of the application of a triggering pulse to its gate until such time that the induced voltage therethrough reaches a zero point whereupon the SCR will revert to its normal blocking state.

Closing the trigger switch means 162 will again turn the gate-controlled semiconductor switch means 154 on and apply current pulses to the armature circuit. If the switch means 162 is closed simultaneously with a pulse being generated by the pulse control circuit to the gate of the SCR 172, the forward applied current pulses will be shunted through the short circuit through the armature including the SCR 172. The amount of impulse signals shunted will be negligible. Since the gate-controlled switch means 154 will conduct at the beginning of the next cycle of applied voltage signal, the pulse circuit signal to the gate of SCR 172 will no longer be applied and the signal pulses to the armature winding will once again be through the armature winding, thereby effecting forward rotation thereof.

If the trigger switch means 162 is closed to restart the armature 128 prior to the dynamic brake current reaching zero, the pulse signals from the pulse control circuit to the gate of SCR 172 will be discontinued, but the SCR 172 will continue conducting the dynamic brake current pulses plus the applied current pulses from the rectifier bridge circuit 140 due to the SCR being forward biased. The high short circuit current pulses through the SCR 172 will continue for approximately one-half second or less, the period required for the dynamic brake current to reach zero and thereby cause the SCR to revert to its blocking state. A suitable resistor 38 is provided in the armature circuit to limit such short circuit current pulses.

The use of the silicon controlled rectifier 172 in the dynamic brake circuit 170 allows dynamic braking only when the shunt wound electric motor is being driven in a normal forward direction. To provide dynamic braking in both the forward and reversed directions of armature rotation, as is required in some installations of the shunt wound motor, the SCR 172 can be replaced with a triac which will conduct the DC current pulses in either direction and revert to a blocking state when the current applied to its anode reaches a value less than the holding current required to forward bias the triac. It will be understood that the gate of the triac could be readily adapted to receive a signal from the pulse generating circuit through the transformer 182.

While preferred embodiments of my invention have been shown and described, it will be understood that changes and modifications may be made therein without departing from the invention in its broader aspects and, therefore, the appended claims are intended to cover all such changes and modifications as fall within the true spirit and scope of my invention.

What is claimed is:

1. A system for controlling a shunt wound DC electric motor having relatively movable field and armature winding means, comprising, circuit means including rectifier means, said circuit means being adapted to connect the field and armature winding means to an alternating current supply for applying current pulses to the field and armature winding means, said circuit means including first semiconductor switch means comprising a gate-controlled semiconductor switch for selectively controlling the application of current pulses to the armature winding means, said circuit means including switch means manually operable to selectively connect the gate of said gate-controlled semiconductor switch to the alternating current supply, the application of current pulses to the field and armature winding means serving to establish magnetic fluxes about said field and armature winding means and create counter electromotive forces during relative movement between the field and armature winding means, and additional circuit means including semiconductor means associated with the armature winding means and providing a first directional closed current path through the armature winding means for induced current pulses created by a counter electromotive force upon collapse of one of the magnetic fluxes, said semiconductor means preventing current flow therethrough in a direction opposite to said first direction.

2. A system for controlling a shunt would DC electric motor having relatively movable field and armature winding means, comprising, circuit means including rectifier means having first and second rectifier bridge circuits, said first rectifier bridge circuit being connected to the field winding means, said second rectifier bridge circuit being connected to the armature winding means, said circuit means being adapted to connect the field and armature winding means to an alternating current supply for applying current pulses to the field and armature winding means, said circuit means including first semiconductor switch means for selectively controlling the application of current pulses to the armature winding means and including means connecting said first semiconductor switch means in series with said second rectifier bridge circuit, the application of current pulses to the field and armature winding means serving to establish magnetic fluxes about said field and armature winding means and create counter electromotive forces during relative movement between the field and armature winding means, and additional circuit means including semiconductor means associated with the armature winding means and providing a first directional closed current path through the armature winding means for induced current pulses created by a counter electromotive force upon collapse of one of the magnetic fluxes, said semiconductor means preventing current flow therethrough in the direction opposite to said first direction, said semiconductor means comprising a silicon controlled rectifier having a control gate, and said additional circuit means including a phase controlled pulse generating circuit connected across said gate-controlled semiconductor switch, said pulse generating circuit being adapted to selectively energize the gate of said silicon controlled rectifier.

3. A control system as defined in claim 2 wherein said pulse generating circuit is transformer coupled to the gate of said silicon controlled rectifier.

4. A system for controlling a shunt wound DC electric motor having first and second field windings and an armature winding, comprising, circuit means including first and second rectifier bridge circuits, said first rectifier bridge circuit being connected to the first field winding, said second bridge circuit being connected to the second field winding and the armature winding, said circuit means being adapted to connect said first and second bridge circuits to an alternating current supply for applying current pulses to the first and second field windings and to the armature winding, a first semiconductor switch means for selectively controlling the application of current pulses to the second field winding and the armature winding, a second semiconductor switch means for selectively controlling the application of current pulses to the first field winding, means for selectively turning said first and second semiconductor switch means on and off, said first and second semiconductor switch means being connected in said circuit means such that simultaneous application of current pulses to the first and second field windings is prevented.

5. A control system as defined in claim 4 including additional circuit means associated with the armature winding, said additional circuit means including semiconductor means and providing a first directional closed current path through the armature winding for induced current pulses created by a counter electromotive force in the armature winding when said first semiconductor switch means is turned off and said second semiconductor switch means is turned on, said semiconductor means preventing current flow through said additional circuit means in a direction opposite to said first direction.

6. A control system as defined in claim 4 wherein said first and second semiconductor switch means comprise first and second gate-controlled semiconductor switches, and including switch means operable to selectively connect the gate of said first gate-controlled semiconductor switch to the alternating current supply.

7. A control system as defined in claim 6 wherein the gate of said second gate-controlled semiconductor switch is connected in circuit with first gate-controlled semiconductor switch such that upon closing said selectively operable switch means, said first semiconductor switch means will be turned on and said second semiconductor switch means will be turned off.

8. A control system as defined in claim 4 including a diode connected across said second field winding.

References Cited

UNITED STATES PATENTS

| 3,335,351 | 8/1967 | Morris | 318—375 XR |
| 3,364,409 | 1/1968 | Schuepp | 318—345 |
| 3,447,054 | 5/1969 | Hansen et al. | 318—269 |

BENJAMIN DOBECK, Primary Examiner

U.S. Cl. X.R.

318—373